(12) United States Patent
Tahernezhaadi et al.

(10) Patent No.: US 6,351,531 B1
(45) Date of Patent: Feb. 26, 2002

(54) METHOD AND SYSTEM FOR CONTROLLING ECHO CANCELLATION USING ZERO ECHO PATH, RINGING, AND OFF-HOOK DETECTION

(75) Inventors: Mansour Tahernezhaadi, Naperville; Michael J. Kirk, Mount Prospect, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/488,888

(22) Filed: Jan. 21, 2000

(51) Int. Cl.[7] ............................. H04B 3/20; H04M 9/00
(52) U.S. Cl. ..................... 379/401.01; 379/406.02; 379/406.04; 379/406.05; 379/406.07; 379/406.08; 379/406.09
(58) Field of Search .................. 379/400–412

(56) References Cited

U.S. PATENT DOCUMENTS

| | | | |
|---|---|---|---|
| 4,337,378 A | 6/1982 | Davis | 179/18 |
| 4,390,752 A | 6/1983 | Jacobson | 179/6.16 |
| 4,491,701 A | 1/1985 | Duttweiler et al. | 179/170.2 |
| 4,570,034 A | 2/1986 | Serrano | 179/84 |
| 4,679,229 A | 7/1987 | Yamaguchi | 379/373 |
| 4,686,700 A | 8/1987 | Perry | 379/183 |
| 4,757,527 A | 7/1988 | Beniston et al. | 379/410 |
| 4,852,161 A * | 7/1989 | Hagiwara | 379/410 |
| 4,862,450 A | 8/1989 | Guidoux | 370/32.1 |
| 5,155,760 A * | 10/1992 | Johnson et al. | 379/67 |
| 5,544,241 A | 8/1996 | Dibner et al. | 379/373 |
| 5,832,075 A | 11/1998 | Gancarcik | 379/377 |
| 5,933,495 A * | 3/1999 | Oh | 379/420 |
| 6,167,133 A * | 12/2000 | Caceres et al. | 379/410 |

* cited by examiner

Primary Examiner—Forester W. Isen
Assistant Examiner—Ramnandan Singh
(74) Attorney, Agent, or Firm—Steven A. May

(57) ABSTRACT

A system and method for controlling echo using zero echo path, ringing, and off-hook detection. When conditions for zero echo path are detected, the present embodiment bypasses echo cancellation by replacing the output signal with the input to the echo canceller. In addition, the present embodiment also provides ringing and off-hook detection which additionally evaluate when the output signal should be replaced by the input to the echo canceller. The system and method provides additional detection and control benefits to echo cancellers and can be implemented in echo cancellation systems without substantial change to the existing echo canceller.

31 Claims, 5 Drawing Sheets

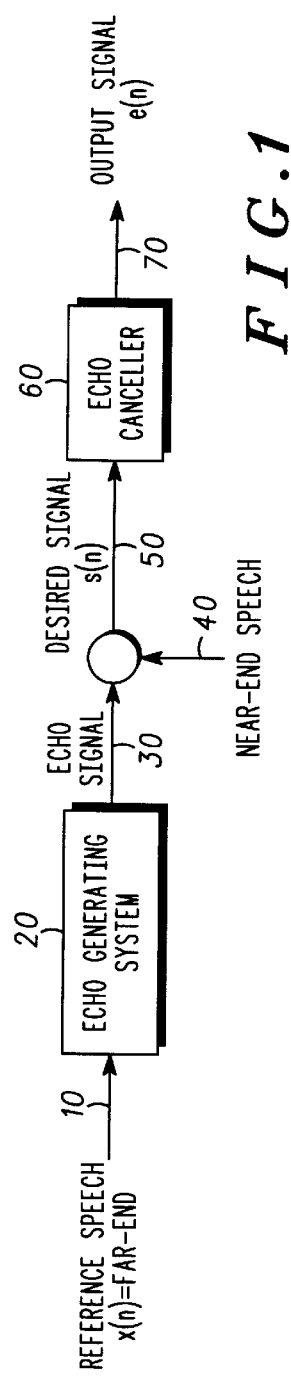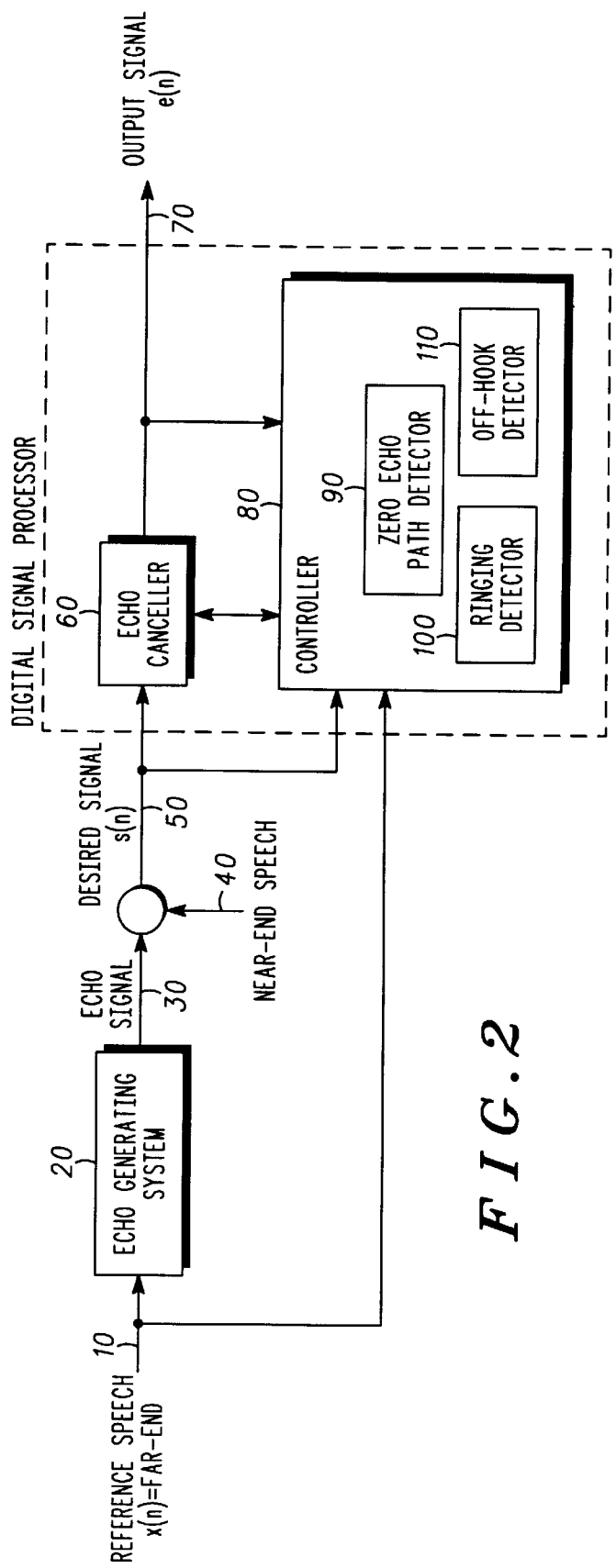

METHOD AND SYSTEM FOR CONTROLLING ECHO CANCELLATION USING ZERO ECHO PATH, RINGING, AND OFF-HOOK DETECTION

BACKGROUND OF THE INVENTION

The present invention relates to echo cancellation in telecommunications systems. In particular, this invention addresses the unnecessary and often detrimental subtraction of synthetic echo by echo cancellers.

An echo cancellation device is a necessary component in modern telecommunications systems. In situations of imperfect impedance matching, a signal broadcast over a telecommunications network may reflect back to the generator of the signal. Since the reflected signal must travel from the location of impedance mismatching and back to the generator, the generator of the signal receives the reflected signal with a delay. This return of a reflected signal with a delay is commonly known as echo. Without echo cancellation, a telephone user would not be able to effectively communicate because the reflected signal would return the speaker's voice to him or her after each uttered sound.

An echo canceller typically operates by generating a synthetic echo created to duplicate the echo signal received by the telephone user. The echo canceller then subtracts the synthetic echo from the incoming signal. The subtraction of the synthetic echo during normal conditions improves the performance of the telephone by diminishing the echo heard by the telephone user. Under certain conditions, however, the echo canceller can degrade the performance of the telephone. The echo canceller may falsely adapt during ringing by creating a synthetic echo when there is no significant echo signal. In addition, the echo canceller may react too slowly in generating a synthetic echo and enhance echo where there is a change from a zero echo path connection to a finite echo path connection and vice versa. For example, the echo canceller may falsely adapt when the telephone receiving the call goes off-hook.

Without ringing and off-hook detectors, the echo canceller can degrade performance of the cellular telephone when a mobile caller places a call to a landline or analog telephone. This degradation is manifested in either initial echo enhancement or severely increased convergence time which, in turn, leads to an echo that remains uncancelled.

Most echo cancellers typically utilize a double-talk detection algorithm. This algorithm is based on the assumption that the caller is silent during ringing. If, however, the mobile caller is not silent or if there is background noise, the double-talk detection algorithm may allow the echo canceller to generate a synthetic echo when the mobile caller signal level, also known as the reference signal power, exceeds the ringing level. Consequently, the echo canceller falsely adapts by improperly generating synthetic echo during ringing periods. In addition, when the receiving phone goes off-hook, the echo canceller may initially exhibit echo enhancement or fail to cancel the echo signal.

Problems with prior methods of echo cancellation may also occur because of severe echo path changes. This occurs when the communications network changes from a zero echo path to a finite echo path or vice versa. A typical zero echo path network is a 4-wire phone network. Connections to directory assistance utilize the 4-wire system. Most other connections utilize a 2-wire system that generates an echo signal. The presence of the echo signal in the network creates a finite echo path.

Severe echo path changes are likely to occur if a mobile caller that is connected to a 2-wire landline phone, finite echo path network, is transferred to a 4-wire phone, zero echo path network. Severe echo path changes may also occur if a mobile caller that is connected to a 4-wire phone, zero echo path network, is transferred to a 2-wire phone, finite echo path landline phone. This scenario is likely to occur when a mobile caller is transferred by directory assistance.

The prior art lacks the ability to adequately control the echo canceller to counteract its tendency to falsely adapt during ringing and failure to account for the conditions created when the telephone line goes off-hook. In addition, the prior art does not adequately address changes from zero echo path networks to finite echo path networks and vice versa.

BRIEF DESCRIPTION OF THE DRAWINGS

FIG. 1 shows a block diagram of a prior art echo cancellation system.

FIG. 2 is a block diagram of one present embodiment of a system for controlling echo cancellation using zero echo path, ringing, and off-hook detection.

DETAILED DESCRIPTION OF THE PRESENTLY PREFERRED EMBODIMENTS

Figure 3:
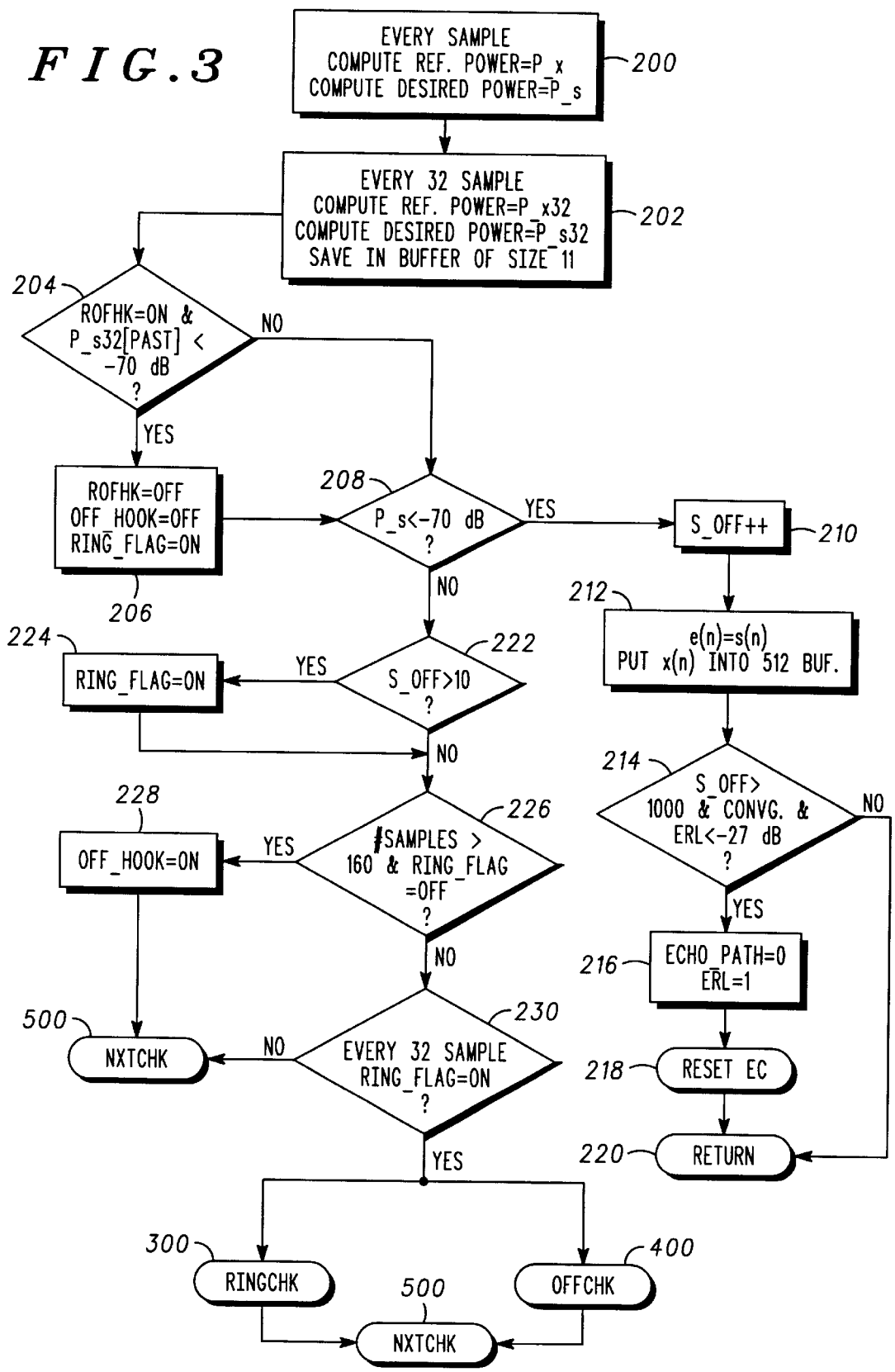
FIG. 3 is one preferred main flowchart demonstrating the overall flow for a method for controlling echo cancellation using zero echo path, ringing, and off-hook detection.

The preferred embodiment incorporates low-complexity ringing, off-hook, and zero echo path detectors into an echo cancellation system directed to cellular telephone technology. In particular, the preferred embodiment is implemented in the telecommunications infrastructure. Specifically, the preferred embodiment is implemented at the transcoder level of the infrastructure. In the alternative, the echo cancellation system may be implemented directly into a cellular telephone or at a different location in the infrastructure.

The present embodiment provides a system and method of detecting ringing that bypasses the subtraction of synthetic echo by the echo canceller upon detection of the ringing tone. By replacing the echo canceller's output with its input, the present embodiment avoids the problems of false adaptation during ringing.

The present embodiment also contains a system and method of off-hook detection to direct the echo canceller to resume adapting the input signal when the landline or analog phone goes off-hook. Thus, the off-hook detector reengages subtraction of the synthetic echo by the echo canceller.

In addition, the present embodiment provides a zero echo path detector to preclude echo enhancement due to possible divergence resulting from changes from zero echo path networks to finite echo path networks and vice versa. If zero echo path is detected, the present system and method bypasses the subtraction of synthetic echo in the echo canceller. This precludes the echo canceller from adding echo to a system with zero echo path, i.e. no echo. If the level of the incoming signal is low enough, the echo canceller may create echo where there was none. Thus, the present embodiment will bypass the echo canceller when the system conditions indicate a negligible degree of echo. Further, the present invention will reset the adaptive filter of the echo canceller if the incoming signal level has been small enough for a sufficient amount of time while the adaptive filter, given sufficient time to converge, yields a small amount of coefficient energy.

In the preferred embodiment, the echo canceller is stored in memory as a computer program written in assembly language and run by a digital signal processor such as the Motorola 56301. In the alternative, the present embodiment can be implemented using a general processor and a variety of programming languages, such as C++. In addition, a hardwired implementation via field programmable gate arrays (FPGA) may also be used. Like the echo canceller, the ringing, off-hook, and zero echo path detection is implemented by storing a computer program in memory, which is run by a digital signal processor. The preferred embodiment can thus be implemented without disturbing a preexisting echo canceller.

FIG. 1 depicts a typical prior art echo cancellation system. A reference signal 10 is inputted into an echo generating system 20. As a result of the echo generating system 20, an echo signal 30 is created. The reference signal 10, also referred to as the far-end speech x(n), is one of two speech signals in the echo cancellation signal. The other speech signal is the near-end speech signal 40. The aggregate of the near-end speech signal 40 and the echo signal 30 creates a desired signal 50. The desired signal 50 is notated as s(n). The echo canceller 60 seeks to transmit the desired signal 50 as echo-free as possible. The echo canceller 60 yields an output signal 70, notated as e(n).

In order to transmit the optimal output signal 70, the echo canceller 60 generates a synthetic echo from the desired signal 50. This synthetic echo is created to emulate the echo signal 30. The echo canceller 60 then subtracts the synthetic echo signal from the desired signal 50 to yield the output signal 70. The function of the echo canceller 60 is to negate the effects of the echo generating system 20.

FIG. 2 is a system block diagram of one preferred embodiment for controlling echo cancellation using zero echo path, ringing, and off-hook detection. A controller 80 is coupled with an echo canceller 60. Incorporated in the echo canceller 60 is a zero echo path detector 90, a ringing detector 100, and an off-hook detector 110. The controller 80 serves to bypass subtraction of synthetic echo by the echo canceller 60 when there is ringing or a zero echo path. In instances where the landline or analog telephone is ringing or where there is a zero echo path, the effects of the echo generating system 20 are negligible. Thus, under these conditions, the echo canceller 60 can falsely create a synthetic echo that when subtracted creates echo in the output signal 70. In this scenario, the synthetic echo generated has no appreciable equivalent in the desired signal 50. As a consequence, the subtraction of the synthetic echo from an echo free desired signal results in a degraded output signal 70. The controller 80 disables the echo canceller 60 in order to prevent the echo canceller from adding echo to the desired signal 50.

In the preferred embodiment, both the echo canceller 60 and the controller 80 are stored in a digital signal processor 120 as software routines. Thus, the present embodiment can be incorporated into existing mobile phone technology by simply including the controller 80 and without significantly altering the prior art echo cancellation system. The present embodiment can also be implemented using other digital signal processors in the Motorola, Inc. 563x series or a processor from the Texas Instruments, Inc. TMS320C5x series.

The preferred method is shown in FIGS. 3 through 6. FIG. 3 is a preferred main flowchart. A ROFHK flag, which indicates that the telephone being called has gone off-hook during ringing, is set to OFF during initialization. After initialization, the method begins at step 200 by computing a sample of reference signal energy P_x, and desired signal energy, P_s, based on a rectangular averaging scheme. The preferred method utilizes energy computations created by summing the squares of each of the 32 samples and then dividing the summation by 32. Using a preferred sampling rate of 8000 samples/sec, this corresponds to a 4 millisecond segment of the signal. As one skilled in the art will appreciate, other sample sizes and alternative energy calculations may be used to calculate the reference signal energy and the desired signal energy.

The method then proceeds to step 202 where the reference signal power P_x32, and desired signal power P_s32, are computed and stored in a buffer that retains the present value as well as the previous 10 values. Thus, a history of the reference signal power and the desired signal power is stored in a buffer. While the preferred embodiment uses a buffer that stores 11 values, one skilled in the art will recognize that both larger and smaller buffer sizes may be used without departing from the essential spirit and scope of the invention.

Step 204 next tests if the ROFHK flag is on and if the past buffered energy is less than a past buffered energy threshold. In the preferred embodiment, this threshold is −70 decibels (dB), however, this value can be changed to a user specified background noise estimate.

If the conditions of step 204 are true, the method proceeds to step 206 where the ROFHK flag is set to ON. In addition, the OFF_HOOK flag, which when set to OFF directs the controller to check for off-hook, is set to OFF, Finally, the Ring_Flag, which when set to ON directs the controller to check for ringing, is set to ON. After step 206, the method proceeds to step 208. If any of the conditions of step 204 are false, the method skips step 206 and proceeds to step 208.

In step 208, the desired signal power is checked against a desired signal power threshold. In the preferred embodiment, this threshold is set to −70 dB. If the desired signal power is less than this threshold, the method proceeds to step 210. Otherwise, the method proceeds to step 222.

In step 210, the method concludes that the desired signal is sufficiently silent and increments a silence counter. Next, at step 212, the method replaces the output signal with the desired signal and stores the reference signal in a reference signal buffer. The reference signal buffer serves to store the present value, as well as, previous values of the reference signal. In the preferred embodiment, this reference signal stores a total of 512 reference signal values corresponding to a 64 millisecond echo canceller. As one skilled in the art will recognize, the reference signal buffer can store a greater or smaller number of reference signal values. Step 212 bypasses the subtraction of the synthetic echo by the echo canceller by replacing the output signal with the desired signal.

The method next proceeds to determine whether to reset the echo canceller to its initial state. In step 214 there are three conditions which are assessed. These three conditions evaluate: (1) the value of the silence counter; (2) the setting of a convergence flag; and (3) the echo return loss (ERL).

The first condition compares the silence counter against a primary silence counter threshold. If the silence counter is greater than this threshold, this condition has been met. In the preferred embodiment, this value is set at 1000. Thus, in order to meet the first condition the silence counter must have been incremented 1000 times. This translates to having the desired signal less than −70 dB for more than 125 milliseconds.

The second condition evaluates whether a convergence flag has been set to indicate that the adaptive filter of the echo canceller has a sufficient adaptation count. In other words, the convergence flag indicates whether the echo canceller has had enough time for the set of coefficients driving the adaptive filter to converge. In the preferred embodiment, a setting of ON indicates a sufficient adaptation count.

The third condition compares the echo return loss (ERL) with an echo return loss threshold. In the preferred embodiment, the ERL is determined by evaluating the strength of the synthetic echo created by the echo canceller. If the ERL is low, the echo canceller has not detected a strong echo in the desired signal. In the preferred embodiment, the ERL is determined by squaring the set of coefficients that drives the adaptive filter and the echo return loss threshold is set to a predetermined threshold. In the preferred embodiment, this threshold is set to −27 dB. If the ERL is less than −27 dB, this third condition has been satisfied.

If all three conditions have been satisfied, the controller has identified a desired signal power that is small enough for a long enough time while the echo canceller has made a sufficient adaptation count yielding a small ERL. In this scenario, the method returns the echo canceller to its initial state. This is accomplished in steps 216 and 218. In step 216, the method flags the zero echo path condition and resets the ERL to a value of 1. In step 218, the method resets the echo canceller. After step 218, the method continues to step 220 which returns the method to the main echo cancellation routine. If any of the three conditions of step 214 are not met, however, the method skips to step 220, where the method returns to the main echo cancellation routine.

Referring back to step 208, if the method does not detect a desired power signal that is less than the desired power signal threshold, the method proceeds to step 222. At this point, the method begins evaluation as to whether ringing detection and off-hook detection should occur. In step 222, the method evaluates whether the silence counter referred to in step 210, is greater than a secondary silence counter threshold. In the preferred embodiment, this secondary silence counter threshold is set at 10. Thus, the desired signal power must be less than −70 dB for at least 1.25 milliseconds for this condition to be satisfied. If this condition is satisfied, the method continues to step 224 where the method sets a check for a ringing flag, notated as Ring_Flag, to indicate that the method should check for ringing. After step 224, the method proceeds to step 226. If this condition is not met, step 224 is skipped and the method moves from step 222 to step 226 without setting the check for a ringing flag.

In step 226, the method checks if the number of samples are greater than a sample threshold and if the check for ringing flag is set to bypass ringing detection. In the preferred embodiment, the sample threshold is 160 samples and the Ring_Flag is set to OFF. If the number of samples are sufficient and the check for ringing flag is set to bypass ringing, the method proceeds to step 228 where the method sets the check for off-hook flag, notated as Off_Hook, to indicate bypassing of the off-hook detection. After step 228, the method moves to step 500. If the conditions of step 226 are not met, the method moves to step 230, where the check for ringing flag is evaluated every 32 samples. If the ringing flag is set to indicate the need for ringing detection, the method proceeds to steps 300 and 400. If the ringing flag is not set to indicate the need for ringing detection, the method moves to step 500.

As indicated in FIG. 3, the ringing detection beginning in step 300 and the off-hook detection beginning in step 400 both conclude with the commencement of step 500. Thus, with the exception of the scenario in which the desired signal power is greater than the desired signal power threshold in step 208, step 500 will always be reached by the method.

Now referring to FIG. 4, a flowchart of the preferred method for ringing detection is depicted, which is accompanied by a table of the preferred embodiment's conditions for ringing detection included below. The table provides the conditions for steps 302, 306, and 308.

TABLE

| Condition A3 | Convg = OFF; Ring_Flag = ON; and OFF_Hook = OFF |
|---|---|
| Condition A4 | Ave_s[PAST-5]>−50 dB; Ave_s[PAST-5]>Ave_s − 1.2 dB; Ave_s[PAST-5]<Ave_s + 1.2 dB |
| Condition A5 | Ave_x[PAST-5]>−50 dB; Ave_x[PAST-5]>Ave_x − 1.2 dB; Ave_x[PAST-5]<Ave_x + 1.2 dB |

Figure 4:
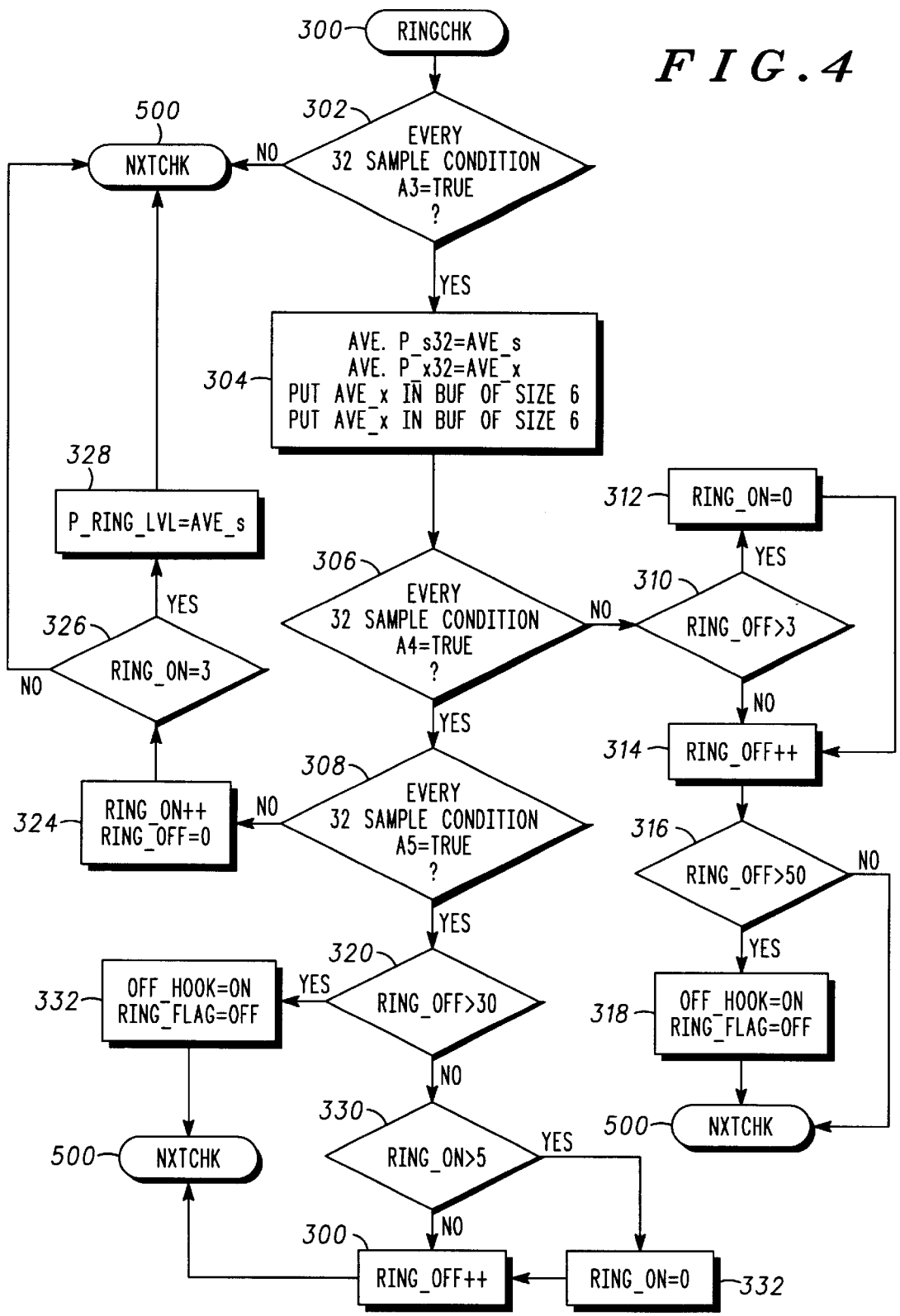
FIG. 4 is a more detailed flowchart of the method of ringing detection referred to in FIG. 3.

In FIG. 4, step 300 marks the beginning of the ringing detection. In step 302, the method checks condition A3, included in the above table, every 32 samples. Thus, step 302 checks whether the convergence flag is set to OFF, the Ring_Flag is set to ON, and if the Off_Hook flag is set to OFF. As one skilled in the art will recognize, these specific settings are somewhat arbitrary because one can choose whether the setting should be ON or OFF according to design preference. Condition A3 indicates that the echo canceller has not reached a sufficient adaptation count and that the method should perform ringing and off-hook detection. If condition A3 is true, the method proceeds to step 304. If it is false, the method proceeds to step 500.

In step 304, the method computes the average energy of the desired signal power, P_s32. This is notated as Ave_s. The average energy of the reference signal power P_x32, is also produced. In the flowchart, this is notated as Ave_x. Both Ave_s and Ave_x are stored in a buffer of size 6. One skilled in the art will also recognize that the average energy can be computed in a variety of ways and shorter or longer buffer lengths can be employed depending on the desired degree of accuracy to detect ringing. In the preferred embodiment, the Ave_x and Ave_s are computed by performing exponential averaging on P_x32 and P_s32, respectively. Alternatively, one may use other averaging schemes such as rectangular window averaging. The method then proceeds to step 306.

In step 306, the method evaluates condition A4. As noted in the above table, condition A4 evaluates the consistency of the average desired signal energy. Step 306, by way of condition A4, first evaluates whether a past average desired signal energy is greater than a past average desired signal energy threshold. This portion of condition A4 evaluates whether there is sufficient energy in the desired signal to encompass a ring signal.

In the preferred embodiment, condition A4 evaluates the past average desired signal energy from five earlier samples and utilizes a threshold of −50 dB.

Assuming the past average desired signal energy is greater than this threshold, condition A4 examines the consistency of the average desired signal energy. As signified by the second and third inequalities of condition A4, the method in step 306 in evaluating condition A4 determines whether the average desired signal energy has not sufficiently deviated from the past average desired signal energy. This method of ringing detection is based on the fact that the average energy from a signal containing a periodic ringing signal would remain constant. In the preferred embodiment, the method evaluates whether the average desired energy has remained within 1.2 dB of the past average desired signal energy and uses a past average desired signal energy from five earlier cycles. As one skilled in the art will recognize, the consistency of the average desired signal energy can be evaluated in numerous ways. For example, more past average desired signal energies, or longer or shorter intervals between the average desired signal energy and the past average desired signal energy, may be used.

If condition A4 is satisfied, the method has sufficiently detected a ringing signal. In the preferred embodiment, however, the method continues to evaluate the consistency of the reference signal energy. This is accomplished in step 308, which is reached if step 306 finds condition A4 to be true. Step 308 and condition A5 are similar to step 306 with the exception that the reference signal energy is examined instead of the desired signal energy. Step 308 is included to prevent false ringing detection when a tonal signal is used to test the echo cancellation system. As one skilled in the art will recognize, ringing detection is sufficient with step 306. Further, as the bounds used in condition A4 may be varied, so may those of condition A5 without remaining identical to the A4 bounds.

Referring back to step 306, the method continues on to step 310 if condition A4 is not satisfied. Steps 310 through 318 evaluate the presence of a ringing signal by setting and incrementing ring_on and ring_off counters. By evaluating these values the method determines whether to bypass further ringing and off-hook detection. Steps 310 through 318 are indicative of the preferred embodiment and are not the sole method of evaluating whether to further bypass ringing and off-hook detection. In the alternative, one skilled in the art may change the count values for Ring_off in steps 310 and 316 to decide whether to bypass ringing and off-hook detection.

In step 310, the method checks if a ring_off counter is greater than 3. If it is, the method proceeds to step 312 where a ring_on flag is set to zero. The method then continues to step 314 where the ring_off is counter incremented. If the ring_off counter in step 310 is not greater than 3, the method skips step 312 and continues with step 314. In step 316, the method evaluates whether the ring_off flag is greater than 50. If it is, the method sets the off_hook flag to ON and the Ring_Flag to OFF in step 318. After step 318, the method proceeds to step 500. If, in step 316, the ring_off flag is not greater than 50, the method skips to step 500.

Referring again to step 308, if condition A5 is satisfied, the method proceeds to check if the ring_off counter is greater than a ring_off counter threshold in step 320. In the preferred embodiment, this is set at 30. If the ring_off counter is greater than this threshold, the method continues to step 322 where the method indicates that ringing and off-hook detection should not continue. After step 322, the method continues at step 500. If however, condition A5 is not met, the method increments the ring_on counter and sets the ring_off counter to zero in step 324.

After step 324, the method proceeds to step 326 where the method evaluates the value of the ring_on counter. In the preferred embodiment, the method tests if the ring_on counter is set to 3. However, as one skilled in the art will recognize, other values may be used in step 326. If this test is true, the method proceeds to step 328 where the ringing power level, notated as P_ring_lvl, is set to the average desired signal energy. After step 328, the method proceeds to step 500. If the test in step 326 is false, the method skips step 328 and proceeds to step 500.

Referring again to step 320 where conditions A4 and A5 have been met in steps 306 and 308 respectively. As mentioned earlier if the ring_off counter is greater than the ring_off counter threshold, the method proceeds to step 322 and then to step 500. If, however, the ring_off counter does not exceed its threshold, the method continues to step 330. In step 330, the method evaluates whether the ring_on counter is greater than a ring on threshold. In the preferred embodiment, the ring on threshold is set to 5. If the ring_on counter is greater than this threshold, the method continues to step 332 where the ring_on counter is set to zero. The method then proceeds to step 334 where the ring_off counter is incremented. If, in step 330, the ring_on counter does not exceed this threshold, the method skips step 332 and proceeds to step 334. After step 334, the method proceeds to step 500.

Figure 5:
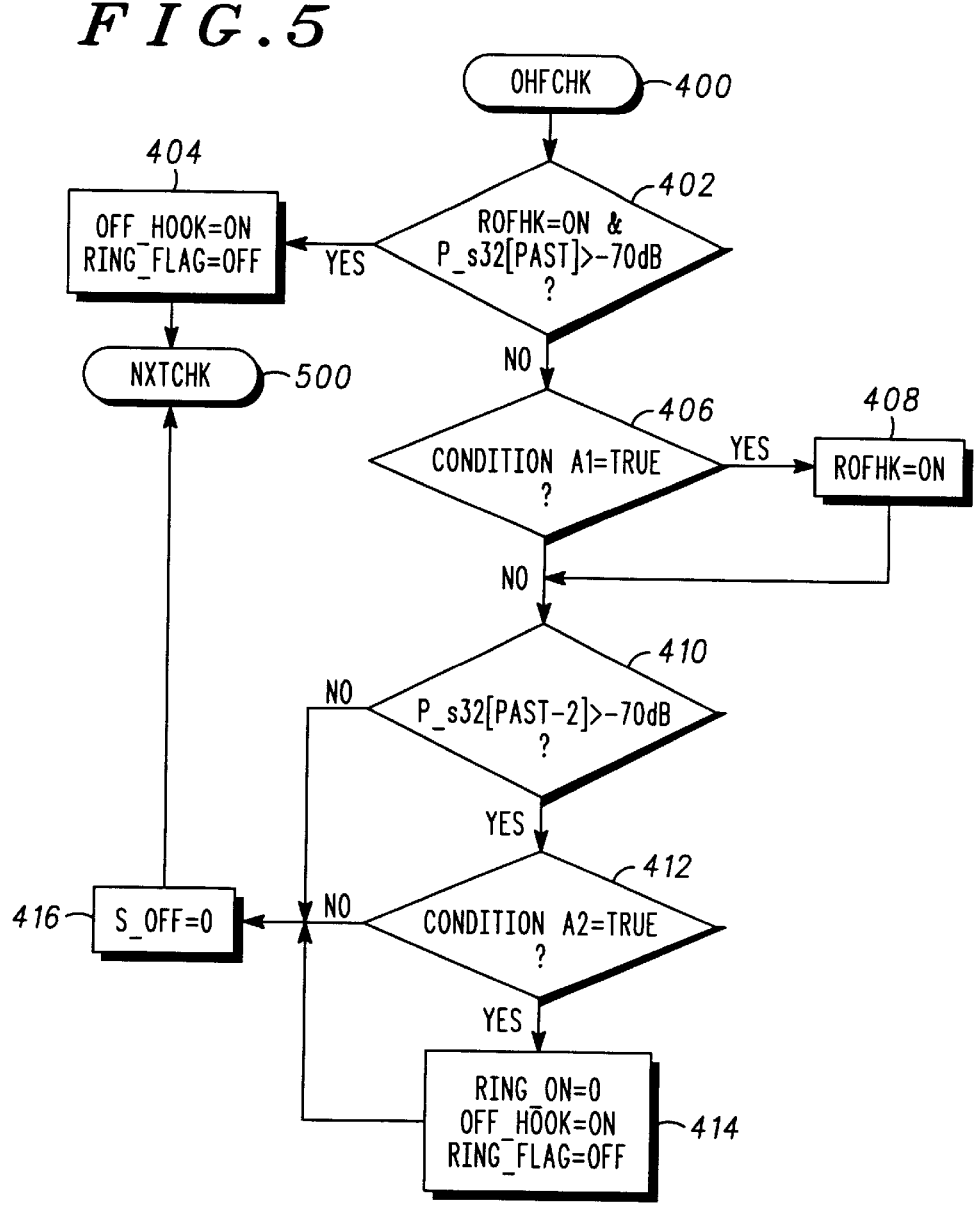
FIG. 5 is a more detailed flowchart of the preferred method of off-hook detection referred to in FIG. 3.

Now referring to FIG. 5, the commencement of the off-hook detection is signified in the flowchart as step 400. In step 402, the method tests if the off-hook while ringing flag indicates that the line has gone off-hook while ringing and if past average desired power is greater than a past average desired power threshold. In the preferred embodiment, this is accomplished by evaluating whether the ROFHK flag is set to ON and whether the past average desired power is greater than −70 dB. If these conditions are met, the method proceeds to step 404. There, the method indicates that ringing and off-hook detection are not necessary. The method then proceeds to step 500. If the conditions of step 402 are not met, the method evaluates whether condition A1 is met in step 406. Condition A1 tests for a sudden drop in signal energy while ringing. In the preferred embodiment, condition A1 consists of four evalutations: (1) the past desired signal power is tested to determine if it is greater than a past desired signal power, set at −70 dB; (2) the past desired signal power is compared with an earlier past signal power to determine if it is significantly less than the earlier past signal power; (3) the ringing power level is compared with an earlier past signal power to evaluate whether the earlier past signal power is sufficiently close to the ringing power level; and (4) Ring_on flag must be greater than 1. Condition A1 captures the telephone going off-hook during ringing by looking for a drop of at least 15 dB in the desired signal level given that its past state was a ringing state.

If condition A1 is met in step 406, the method proceeds to step 408 where the off-hook during ringing flag is set to indicate that the telephone line went off-hook during ringing. The method then proceeds to step 410. If condition A1 is not met, the method bypasses step 408 and goes directly to step 410.

In step 410, the method checks if an earlier past desired signal energy is less than the past desired signal power threshold. In the preferred embodiment, this threshold is set at −70 dB. In the alternative, other levels can be used, including levels distinct and separate from the past desired signal energy used in step 406. If the earlier past desired signal power is greater than this threshold, the method proceeds to step 416 where the silence counter is set to zero. From step 416, the method proceeds to step 500. If the earlier past desired signal power is less than this threshold, the method continues by evaluating whether the line went off-hook during an interval between ringing. This is accomplished in step 412 by evaluating condition A2. In condition A2, the method determines if the past desired signal power is greater than the past signal power threshold, but less than the ringing power level by a ringing power level threshold. In the preferred embodiment, the past signal power threshold is 70 dB and the ringing power level threshold is 20 dB. If condition A2 is met, the method has detected that the line was going off-hook between rings. The method then proceeds to step 414 where the ring_on flag is set to zero and the ringing and off-hook detection flags are set to bypass further ringing and off-hook detection. The method next proceeds to step 416. If step 412 finds that condition A2 is not met, the method moves directly to step 416. In all instances, commencement at step 400 concludes with step 500.

Figure 6:
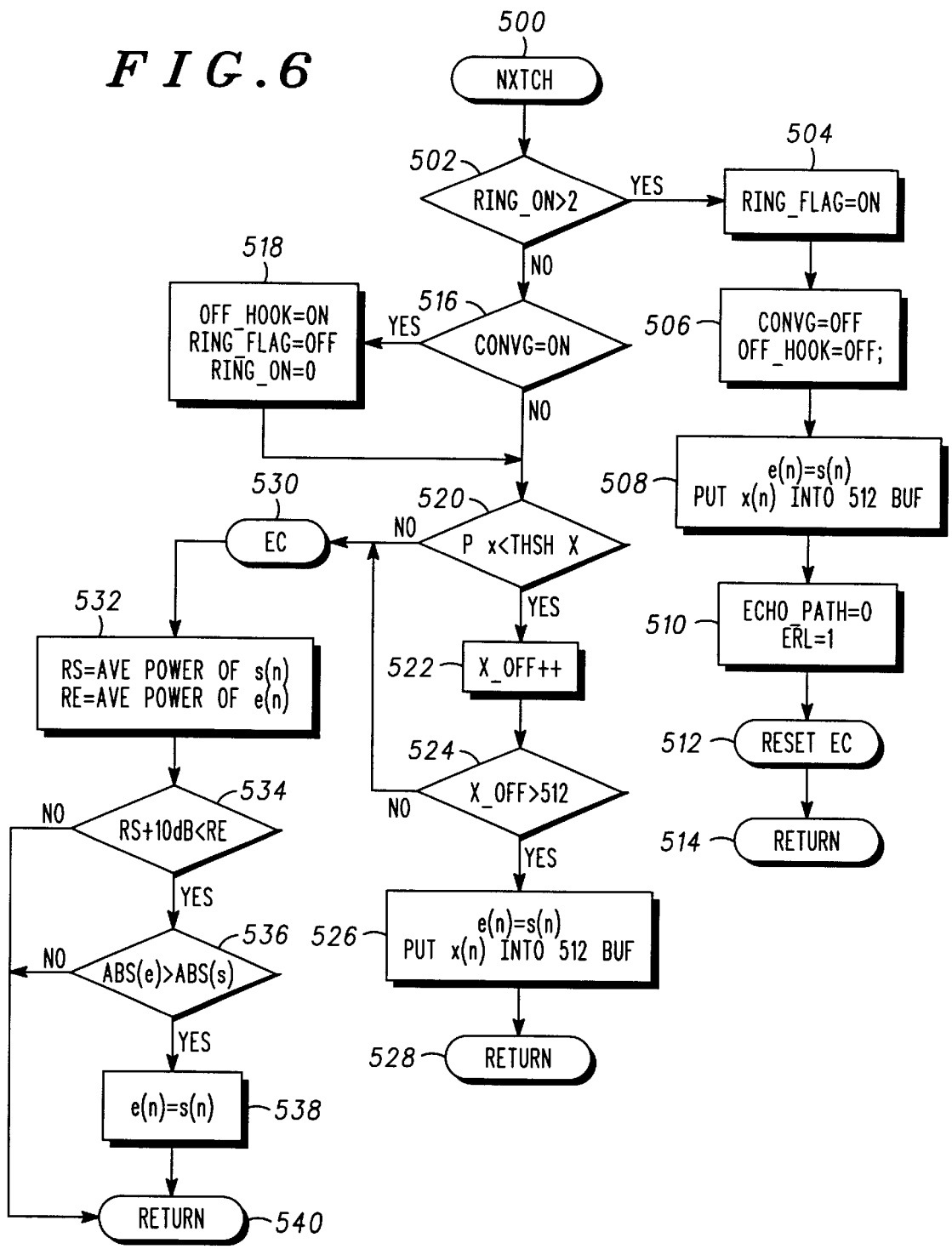
FIG. 6 is a more detailed flowchart of the next check portion of the method using zero echo path, ringing, and off-hook detection referred to in FIG. 3.

Referring now to FIG. 6, a flowchart of the nxtchk portion of the preferred method is shown. The nxtchk subroutine begins at step 500. In step 502, the method checks if the ring_on counter is greater than 2. As one skilled in the art will recognize, step 502 may check for a different ring_on counter value. In the preferred embodiment, a ring_on counter value greater than 2 is considered indicative of ringing and a zero echo path. Consequently, if this condition is met, the method proceeds to step 504 where the check for ringing flag is set to ON. The method then continues to step 506 where the convergence flag is set to OFF and the off-hook flag is set to OFF to indicate the need to detect off-hook conditions. Next, the method in step 508 bypasses the subtraction of synthetic echo by the echo canceller and puts the reference signal into a buffer of size 512. The method then proceeds to step 510 where the method indicates the presence of a zero echo path and sets the ERL to 1. The method resets the echo canceller in step 512 and returns to the main cancellation routine by way of step 514.

If the ring_on counter is not greater than 2, the method proceeds from step 502 to step 516 where the method tests if the convergence flag indicates a sufficient adaptation count. If there is a sufficient adaptation count, the method proceeds to step 518. In step 518, the method indicates that ringing and off-hook detection are not needed and sets the ring_on flag to zero. The method then proceeds to step 520. If there is not a sufficient adaptation count, the method skips step 518 and goes to step 520.

In step 520, the method checks if the reference signal power is less than a reference signal power threshold. In the preferred embodiment, this threshold is set to noise floor of the reference signal. If the reference signal power is less than this threshold, the method increments the reference signal power counter in step 522. Next, the method checks if the reference signal power counter is greater than a reference signal power counter threshold in step 524. In the preferred embodiment, this threshold is set to 512. If the reference signal power is greater than the threshold, the method again bypasses the echo canceller and places the reference signal into a buffer of size 512 in step 526. From step 526, the method returns to the main echo cancellation routine by way of step 528. If either the conditions in step 520 or step 526 are not met, the method proceeds to the normal echo cancellation method as represented in step 530.

The present embodiment also checks the output of the echo canceller as represented in steps 532 through 540. In step 532, the method samples the desired signal and the output signal, and evaluates the average desired signal power and the average output signal power. Next, in step 534, the method evaluates whether the average output signal power is exceeds the average desired signal power by a power comparison threshold. In the preferred embodiment, the power comparison threshold is 10 dB. As one skilled in the art will recognize, other values can be used besides 10 dB. In the alternative, the method in step 534 could determine if the average output signal power is simply greater than the average desired signal power. If the condition of step 534 is met, the method continues to step 536. If it is not met, the method returns to the main echo cancellation routine by way of step 540.

In step 536, the method evaluates whether the magnitude of the output signal is greater than the magnitude of the desired signal. If this condition is met, the method bypasses the echo canceller in step 538. This is done by replacing the output signal with the desired signal. After step 538, the method returns to the main echo cancellation routine by way of step 540. If the conditions of step 534 or step 536 are not met, the method simply returns to the main echo cancellation routine by way of step 540.

The present invention provides ringing, off-hook, and zero echo path detection to control echo cancellation. By identifying instances in which the normal operation of a prior art echo canceller will degrade the quality of the output signal, the present embodiment can direct the use of the optimum mode of echo cancellation. Ringing and zero echo path detection identify when echo cancellation should be bypassed. Off-hook detection identifies when echo cancellation should resume after ringing detection has occurred.

While the present embodiment serves to bypass echo cancellation, the present invention may also be used to select different methods of echo cancellation. In other words, ringing, off-hook, or zero-echo path detection may be used to switch from one echo cancellation system to another. A complete bypass of a prior art mode of echo cancellation is not required in the present invention. The present invention can be implemented as an addition to a previously existing echo cancellation system or incorporated as an element in a new echo cancellation system. By evaluating signals in the telecommunications network, the present invention can better control the mode of echo cancellation and thus consistently generate a clearer output signal.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A system for controlling echo comprising:
   an echo canceller that receives a desired signal and outputs an output signal based on the desired signal; and
   a controller coupled with said echo canceller operative to replace said output signal with said desired signal upon detection of a zero echo path.

2. The system in claim 1 wherein said controller replaces said output signal with said desired signal if said output signal exceeds said desired signal by a power comparison threshold.

3. The system of claim 1 wherein said controller replaces said output signal with said desired signal if the magnitude of said output signal is greater than the magnitude of said desired signal.

4. The system in claim 1 wherein said echo canceller and said controller are implemented as software programs stored in a memory.

5. The system in claim 1 wherein said controller is operative to detect ringing.

6. The system in claim 1 wherein said controller is operative to detect when a telephone line is off-hook.

7. The system in claim 1 wherein said echo canceller is implemented in a telecommunications infrastructure.

8. The system in claim 1 wherein said echo canceller is implemented in a cellular telephone.

9. A system for controlling echo comprising:
   an echo canceller that receives a desired signal and outputs an output signal based on the desired signal; and
   a zero echo path detector coupled to said echo canceller that is operative to bypass the subtraction of synthetic echo by said echo canceller upon detection of a zero echo path.

10. The system in claim 9 wherein said zero echo path detector is operative to reset synthetic echo generation by said echo canceller.

11. The system in claim 9 wherein said zero echo path detector is comprised of:
    a desired signal power evaluated from said desired signal and a first comparator operative to compare said desired signal power with a desired signal power threshold.

12. The system in claim 11 wherein said zero echo path detector is further comprised of:
    a counter coupled with said first comparator;
    a second comparator coupled with said counter operative to compare said counter with a timing threshold.

13. The system in claim 11 wherein said zero echo path detector is further comprised of:
    an adaptive filter responsive to a set of coefficients incorporated in said echo canceller:
    a convergence flag operative to indicate when said set of coefficients have converged.

14. The system in claim 11 wherein said zero echo path detector is further comprised of:
    an adaptive filter responsive to a set of coefficients incorporated in said echo canceller and
    an echo return loss processor operative to square said set of coefficients.

15. A system for controlling echo comprising:
    an echo canceller that receives a desired signal and outputs an output signal based on the desired signal, and
    a means for detecting zero echo path that is operative to replace said output signal with said desired signal upon detection of a zero echo path.

16. A system for controlling echo comprising:
    an echo canceller that receives a desired signal and outputs an output signal based on the desired signal;
    a ringing detector coupled with said echo canceller; and
    a controller coupled with said echo canceller and said ringing detector that is operative to replace said output signal with said desired signal based on a detection of a ringing signal by the ringing detector.

17. The system in claim 16 wherein said ring detector is operative to evaluate the consistency over time of a desired signal power measurement from said desired signal.

18. The system in claim 16 wherein said ring detector is operative to evaluate the consistency over time of a reference signal power measurement from said desired signal.

19. A system for controlling echo comprising:
    an echo canceller that receives a desired signal and outputs an output signal based on the de sired signal;
    a means coupled with said echo canceller for detecting ringing; and
    a controller coupled with said echo canceller and said means for detecting ringing that is operative to bypass the subtraction of synthetic echo by said echo canceller based upon detection of a ringing signal by the means for detecting ringing.

20. The system of c claim 19, further comprising an off-hook detector coupled with said echo canceller and said controller that detects whether a connection has gone o off-hook during ringing, wherein the controller is operative to resume the subtraction of synthetic echo by said echo canceller based upon detection that the connection has gone off-hook during ringing.

21. The system in claim 20 wherein said off-hook detector is operative to evaluate a telephone receiver going off-hook during ringing.

22. The system in claim 20 wherein said off-hook detector is operative to evaluate a telephone receiver going off-hook during intermittent silence between telephone rings.

23. The system in claim 20 wherein said off-hook detector is operative to evaluate a desired power signal from said desired signal and a reference signal power signal from said reference power signal.

24. The system of claim 19, further comprising a means for detecting if a telephone receiver is off-hook, wherein the controller is operative to resume the subtraction of synthetic echo by said echo canceller based upon detection that the telephone receiver is off-hook.

25. A method for controlling echo in a cellular telephone, comprising:
    providing a reference signal, a desired signal, an echo canceller, and an output signal;
    computing a desired signal power;
    comparing said desired signal power with a desired signal power threshold; and
    replacing said output signal with a desired signal.

26. The method in claim 25 further comprising:
    incrementing a counter;
    comparing said counter with a counter threshold; evaluating whether a set of coefficients operative to drive a filter in said echo canceller has converged;
    squaring said set of coefficients and comparing the results with an echo return loss threshold;
    resetting generation of synthetic echo in said echo canceller.

27. A method for controlling echo in a cellular telephone having an echo canceller, comprising steps of:
    receiving, by the echo canceller, a desired signal,
    producing, by the echo canceller, an output signal based on the desired signal;
    determining an average power of said output signal;
    evaluating whether the average power of said output signal exceeds an average power of said desired signal and an average power threshold; and
    replacing said output signal with said desired signal when said average power of said output signal exceeds said average power of said desired signal.

28. A method for controlling echo in a cellular telephone, comprising:
    providing a desired signal, an echo canceller, and an output signal;

evaluating a desired signal magnitude from said desired signal;

evaluating an output signal magnitude from said output signal;

evaluating whether said output signal magnitude is greater than said desired signal magnitude; and replacing said output signal with said desired signal when said output signal magnitude is greater than said desired signal magnitude.

29. A method for controlling echo in a cellular telephone, comprising:

providing a desired signal, an echo canceller, and an output signal;

computing an average desired signal power from said desired signal;

storing said average desired signal power;

storing a past average desired signal power value;

determining whether ringing is occurring by evaluating the consistency of said average desired signal power and said past average desired signal power value; and replacing said output signal with said desired signal when said average desired signal power value does not significantly deviate from said past average desired signal power value.

30. The method of claim 29 further comprising:

providing a reference signal;

computing an average reference signal power from said reference signal;

storing said average reference signal power;

storing a past average reference signal power;

evaluating a degree of consistency of said average reference signal power and said past average reference signal power value.

31. A method for controlling echo in a cellular telephone, comprising:

providing a desired signal, an echo canceller, and an output signal;

computing an average reference signal power;

storing a past average reference signal power; and evaluating a difference between said average reference signal power and said past average reference signal power to determine if a telephone receiver has gone off-hook.

* * * * *